(12) United States Patent
Kwon

(10) Patent No.: US 9,054,631 B2
(45) Date of Patent: Jun. 9, 2015

(54) SERVO CONTROL APPARATUS AND METHOD FOR CONTROLLING THE SAME

(71) Applicant: SAMSUNG ELECTRONICS CO., LTD., Suwon-si, Gyeonggi-do (KR)

(72) Inventor: Sung Gu Kwon, Yingin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 217 days.

(21) Appl. No.: 13/733,581

(22) Filed: Jan. 3, 2013

(65) Prior Publication Data

US 2013/0175969 A1  Jul. 11, 2013

(30) Foreign Application Priority Data

Jan. 5, 2012  (KR) .................. 10-2012-0001547

(51) Int. Cl.
*H02P 6/08* (2006.01)
*H02P 31/00* (2006.01)
*G05B 19/23* (2006.01)

(52) U.S. Cl.
CPC .............. *H02P 31/00* (2013.01); *G05B 19/237* (2013.01); *G05B 2219/42126* (2013.01)

(58) Field of Classification Search
CPC ...................................................... H02P 6/085
USPC ............ 318/590, 568.11, 579, 568.2, 568.21, 318/568.23, 609, 610; 700/249, 250, 257, 700/259, 261, 28, 32, 33, 80, 37, 45, 53; 901/32, 33, 34, 35; 702/85–107
See application file for complete search history.

(56) References Cited

U.S. PATENT DOCUMENTS

| | | | | |
|---|---|---|---|---|
| 4,973,215 A * | 11/1990 | Karlen et al. | ................. | 414/729 |
| 5,341,078 A * | 8/1994 | Torii et al. | ................ | 318/568.22 |
| 5,404,960 A * | 4/1995 | Wada et al. | .................... | 180/446 |
| 5,414,337 A * | 5/1995 | Schuler | .......................... | 318/561 |
| 5,792,483 A * | 8/1998 | Siegrist et al. | ................ | 425/135 |
| 5,855,553 A * | 1/1999 | Tajima et al. | ................. | 600/407 |
| 6,459,926 B1 * | 10/2002 | Nowlin et al. | ................ | 600/429 |
| 6,608,459 B2 * | 8/2003 | Kasagami et al. | ............ | 318/560 |
| 6,636,161 B2 * | 10/2003 | Rosenberg | ...................... | 341/20 |
| 6,659,939 B2 * | 12/2003 | Moll et al. | ..................... | 600/102 |
| 6,837,883 B2 * | 1/2005 | Moll et al. | ......................... | 606/1 |
| 6,975,087 B1 * | 12/2005 | Crabill et al. | ................. | 318/590 |
| 7,087,049 B2 * | 8/2006 | Nowlin et al. | .................... | 606/1 |

(Continued)

FOREIGN PATENT DOCUMENTS

KR  10-2011-0047929  5/2011

*Primary Examiner* — Rita Leykin
(74) *Attorney, Agent, or Firm* — Harness, Dickey & Pierce, P.L.C.

(57) ABSTRACT

A servo control apparatus and method, the servo control apparatus including an input unit configured to receive an execution command with respect to one of a first control mode and a second control mode that are configured to control a motor, a plurality of detection units each configured to detect sensing data required for executing each of the first control mode and the second control mode, and a control unit configured to receive a feedback of the plurality of pieces of sensing data detected through the plurality of detection units while executing the first control mode, determine a point of time when a control mode is needed to be changed if the execution command with respect to the second control mode is input through the input unit, and check the sensing data required for executing the second control mode among the plurality of sensing data that are fed back.

19 Claims, 8 Drawing Sheets

(56) References Cited

U.S. PATENT DOCUMENTS

| | | | |
|---|---|---|---|
| 7,102,541 B2* | 9/2006 | Rosenberg | 341/20 |
| 8,339,091 B2* | 12/2012 | Kamiya | 318/568.2 |
| 8,418,073 B2* | 4/2013 | Mohr et al. | 715/764 |
| 8,423,182 B2* | 4/2013 | Robinson et al. | 700/245 |
| 8,489,235 B2* | 7/2013 | Moll et al. | 700/245 |
| 8,504,201 B2* | 8/2013 | Moll et al. | 700/245 |
| 8,521,331 B2* | 8/2013 | Itkowitz | 700/264 |
| 8,600,551 B2* | 12/2013 | Itkowitz et al. | 700/245 |
| 8,620,473 B2* | 12/2013 | Diolaiti et al. | 700/245 |
| 8,818,559 B2* | 8/2014 | Andoh | 700/261 |
| 2006/0171264 A1 | 8/2006 | Zhou et al. | |
| 2009/0248038 A1 | 10/2009 | Blumenkranz et al. | |
| 2010/0228265 A1* | 9/2010 | Prisco | 606/130 |

* cited by examiner

SERVO CONTROL APPARATUS AND METHOD FOR CONTROLLING THE SAME

CROSS-REFERENCE TO RELATED APPLICATIONS

This application claims the benefit of Korean Patent Application No. 10-2012-0001547, filed on Jan. 5, 2012 in the Korean Intellectual Property Office, the disclosure of which is incorporated herein by reference.

BACKGROUND

1. Field

Embodiments of the present disclosure relate to a servo control apparatus configured to control a motor for an improvement of stability, and a control method thereof.

2. Description of the Related Art

A servo control apparatus is an apparatus configured to control a motor by outputting a position, a direction, and a posture of a servo mechanism as a control value, and following a target value being input.

Here, the motor is used at a machine tool, an optical disc apparatus of a CCTV camera, and a DVD, a printer, and a robot and is configured to swiftly and accurately identify a position, a speed, and a torque, that is a current, according to a position command, a speed command, and a torque command.

The servo control apparatus as the above is configured to perform a control mode at one of a position control, a speed control, or a torque control mode, and control each control mode separately from each other. A circumstance may occur when a control mode is needed to be changed according to a control situation, and at this time, a possibility may arise in having the control situation become unstable.

In particular, in a case of a surgical robot among other autonomous apparatuses, the stability and safety are considered to be important, and thus more caution is needed to be placed in changing a control mode.

More particularly, in a case of a surgical robot, the movement of one arm, which is needed to be controlled, among the four arms of the surgical robot may be changed by a foot pedal switch, while at this time the other arms are unable to move as a brake is applied thereto. The arm presently in movement is also continuously in movement while controlling a motor in a state that a control mode is not changed.

In the above case, a drastic posture change may incur, and thereby a hazardous situation may occur in damaging a portion around the affected area or an incised area of a body.

Accordingly, a servo control apparatus of a surgical robot is configured to control a motor in a state that a control mode is not changed.

Thus, when changing a control mode of a motor, the controlling of the motor is difficult and unstable, and an inconsistent change of information on various control parameters may cause a drastic vibration and an impact.

SUMMARY

Therefore, it is an aspect of the present disclosure to provide a servo control apparatus capable of detecting and storing a sensing data of a motor when a motor is running, extracting a sensing data that is to be required at a control mode that is to be changed when a control mode of a motor is changed, and controlling the control mode that is to be changed by using the sensing data extracted, and a control method thereof.

It is another aspect of the present disclosure to provide a servo control apparatus capable of following a command data by using at least one of a linear function, a sinusoidal function, a polynomial function, and a reset function, and a control method thereof.

It is another aspect of the present disclosure to provide a servo control apparatus capable of including a protocol having a predetermined function needed to follow a command data according to the form of change of a control mode, and capable of controlling a change of a control mode by using the protocol, and a control method thereof.

Additional aspects of the disclosure will be set forth in part in the description which follows and, in part, will be apparent from the description, or may be learned by practice of the disclosure.

In accordance with one aspect of the present disclosure, a servo control apparatus includes an input unit, a plurality of detection units, and a control unit. The input unit may be configured to receive an execution command with respect to one of a first control mode and a second control mode that are configured to control a motor. The plurality of detection units each may be configured to detect sensing data required for executing each of the first control mode and the second control mode. The control unit may be configured to receive a feedback of the plurality of pieces of sensing data detected through the plurality of detection units while executing the first control mode, determine a point of time when a control mode is needed to be changed if the execution command with respect to the second control mode is input through the input unit, check the sensing data required for executing the second control mode among the plurality of sensing data that are fed back, and control a following from the sensing data checked to a command data corresponding to the execution command of the second control mode.

The control unit may be configured to control the following from the sensing data to the command data by using at least one of a linear function, a sinusoidal function, and a polynomial function.

The first control mode may be one of a position control mode, a speed control mode, an acceleration control mode, a current control mode, and a torque control mode. The second control mode may be one of a position control mode, a speed control mode, an acceleration control mode, a current control mode, and a torque control mode. The first control mode may be a control mode different from the second control mode.

The control unit may be configured to store a protocol that is set with a first code corresponding to the control mode and a second code corresponding to a plurality of functions that is required for following from the sensing data to the command data.

The function may further include a reset function configured to reset the sensing data and the command data at a certain value.

The control unit may be configured to control a transmission/reception of the protocol in a case of changing the control mode.

The detection unit may include a position detection unit and a current detection unit. The position detection unit may be configured to detect a rotational position of the motor. The current detection unit may be configured to detect an electric current flowing at the motor.

The control unit may be configured to detect a torque based on the current detected.

The servo control apparatus may further include a torque detection unit configured to detect the torque of the motor.

The detection unit may further include a speed detection unit configured to detect a rotational speed of the motor by differentiating the rotational position.

The control unit may be configured to detect an acceleration speed based on the rotational speed detected.

The control unit may include a command generating unit, a position command generating unit, a speed command generating unit, a current command generating unit, a torque command generating unit, and a power converting unit. The command generating unit may be configured to generate at least one of a position command, a speed command, a current command, and a torque command. The position control unit, when the position command is generated, may be configured to follow a position difference between a position data based on the position command and a position data detected. The speed control unit, when the speed command is generated, may be configured to follow a speed difference between a speed data based on the speed command and a speed data detected. The current control unit, when the current command is generated, may be configured to follow a current difference between a current data based on the current command and a current data detected, calculate a current required for following the data difference, and control the generation of the current calculated. The torque generating unit, when the torque command is generated, may be configured to generate a current to follow a torque difference between a torque data based on the torque command and a torque data detected. The power converting unit may be configured to modulate a pulse width of a power applied to the motor so as to control the current required for following data difference.

The current control unit, when the following of the data is completed, may be configured to calculate a current required for following a torque corresponding to the command data of the second control mode, and control an output of the current calculated.

In accordance with another aspect of the present disclosure, a method of controlling a servo control apparatus is as follows. A motor is controlled through one of a plurality of control modes that is configured to control the motor. A feedback of a plurality of sensing data detected through a plurality of detection units during execution of a certain one of the plurality of control modes may be received. A point of time to change a control mode is determined if an execution command with respect to another control mode is input. A sensing data required during the execution of the other control mode is checked among the feedback of the plurality of sensing data provided at the point of time when the certain one of the control mode is stopped. Data is followed from the sensing data checked to an initial command data of the other control mode. The motor may be controlled through the other control mode when the following from the sensing data checked to the initial command data of the other control mode is completed.

The following of data may include following data from the sensing data to the command data by using at least one of a linear function, a sinusoidal function, and a polynomial function.

The one certain control mode may be one of a position control mode, a speed control mode, an acceleration control mode, a current control mode, and a torque control mode. The other control mode may be a position control mode, a speed control mode, an acceleration control mode, a current control mode, and a torque control mode. The one certain control mode may be a control mode different from the other control mode.

The following of data may include following data based on a protocol set with a first code corresponding to a form of change of the control mode from the one certain control mode to the other control mode, and a second code corresponding to a plurality of functions to follow the data from the sensing data to the command data.

The function may further include a reset function configured to reset the sensing data and the command data at a certain value.

The receiving of the feedback of the plurality of sensing data may include detecting a rotational speed and a current of the motor during the execution of the one certain control mode.

The receiving of the feedback of the plurality of sensing data may be achieved by follows. A torque is detected based on the current detected. A rotational speed of the motor may be detected by differentiating the position. An acceleration may be detected based on the speed detected.

The following of data may be achieved by follows. A torque to follow the data difference is calculated. A current to follow the torque calculated may be calculated. A pulse width of power applied to a motor for generating the current calculated may be calculated.

As described above, an occurrence of a vibration at a motor and a servo apparatus during the mode change of the motor may be prevented, and a rapid change of a posture of the servo apparatus may be restrained, thereby increasing stability thereof.

In addition, the motor may be smoothly controlled at the time of changing the control mode of the motor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
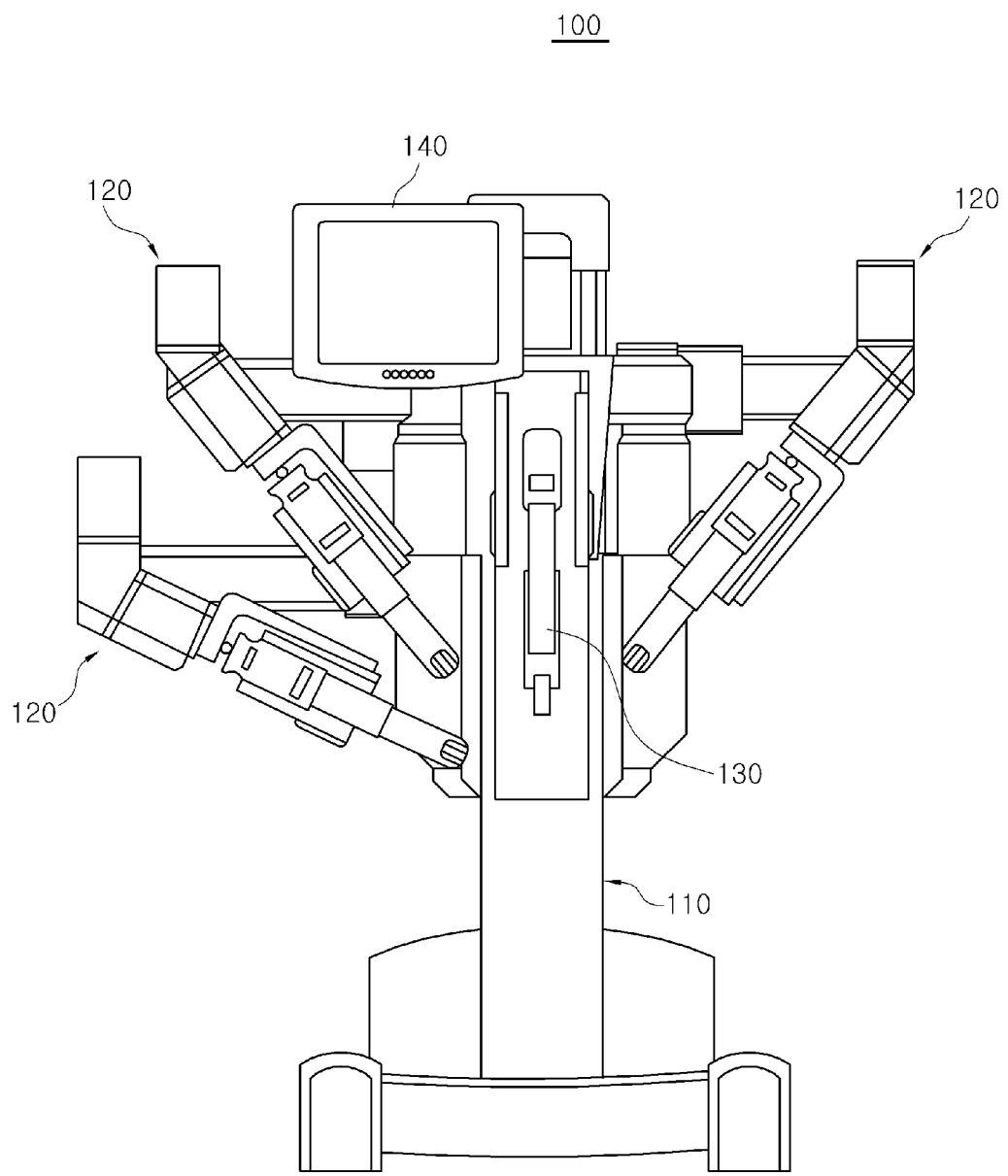
FIG. 1 is a view illustrating a surgical robot provided with a servo control apparatus for controlling a motor in accordance with an embodiment of the present disclosure.

Reference will now be made in detail to the embodiments of the present disclosure, examples of which are illustrated in the accompanying drawings, wherein like reference numerals refer to like elements throughout.

A surgical robot is a robot configured to perform a treatment or a surgical operation on an affected area by moving a surgical instrument according to a command of a user.

A surgical operation by the surgical robot, apart from an open surgery is performed by creating a number of small incisions, inserting the surgical instrument through the small incisions, controlling the movement of the surgical instrument within a set domain after the insertion of the surgical instrument is completed, placing a stop on the movement of the surgical instrument after a surgical procedure is completed, and withdrawing the surgical instrument to an outside. The surgical robot is configured to repeat a series of critical movements a number of times during a surgical operation.

The surgical robot includes a manipulator assembly 100 installed near or on an operating table, a console (not shown) configured for a user to observe an affected area and to control the manipulator assembly 100, and a servo control apparatus 200 configured to control the movement of a plurality of arms of the manipulator assembly 100 or a motor provided at the surgical instrument.

More detailed explanations in regard to the present disclosure will be hereby provided by referring to the attached drawings.

Figure 2:
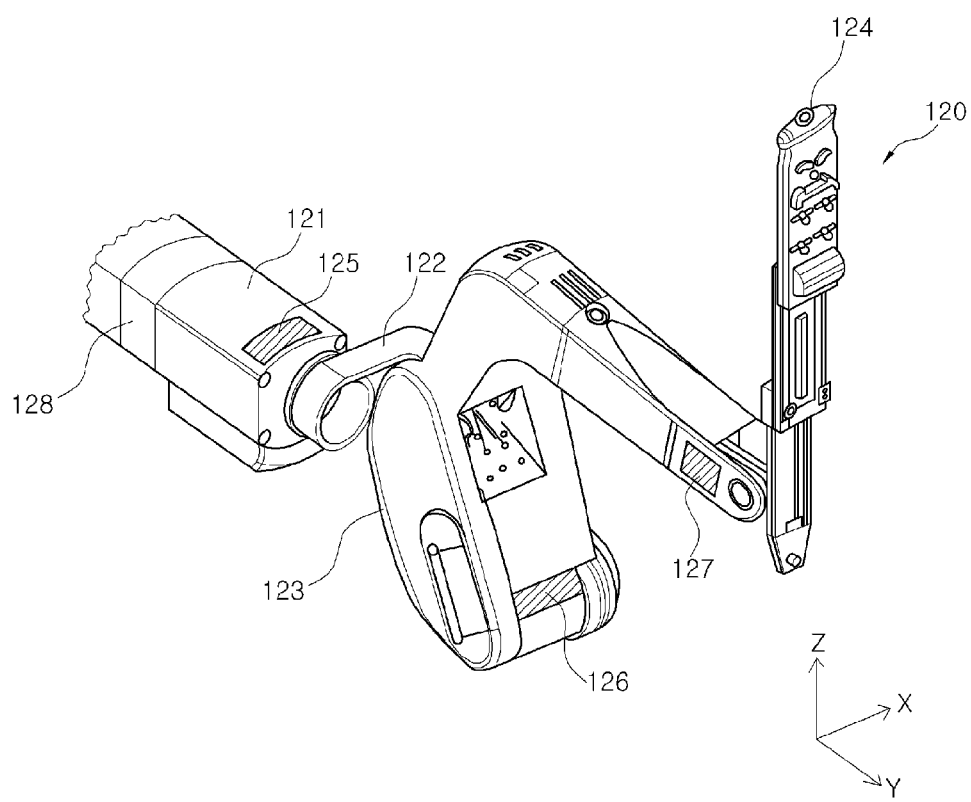
FIGS. 2 to 3 are detailed views illustrating the surgical robot provided with the servo control apparatus in accordance with the embodiment of the present disclosure.
Figure 3:
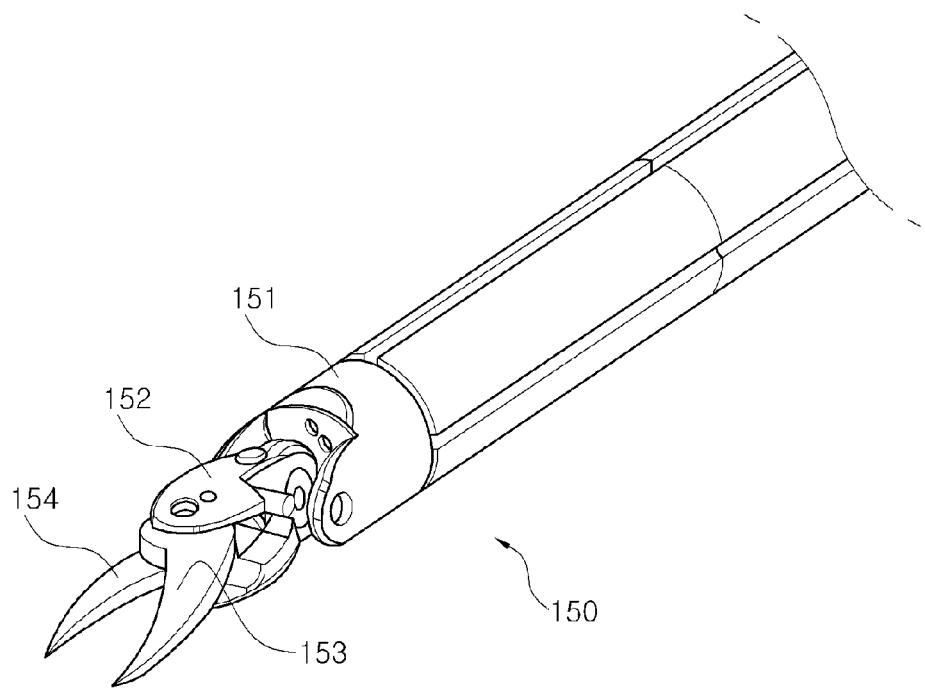

FIG. 1 is a view of a surgical robot provided with a servo control apparatus for controlling a motor in accordance with an embodiment of the present disclosure, and FIGS. 2 to 3 are detailed views of a surgical robot provided with a servo control apparatus in accordance with the embodiment of the present disclosure.

As illustrated on FIG. 1, the manipulator assembly 100 includes a body 110, a plurality of surgical-purpose arms 120 detachably installed at the body 110 and provided with a surgical instrument 150 (see FIG. 3) detachably coupled to each surgical-purpose arm of the plurality of surgical-purpose arms, an endoscopy-purpose arm 130 movably installed at the body 110 and provided with a camera and a lighting to obtain an image of an affected area and of a surrounding, and a display apparatus 140 configured to display the image of the affected area obtained through the endoscopy-purpose arm 130.

The manipulator assembly 100 further includes the servo control apparatus 200 configured to perform a communication with the console and control the operation of the plurality of surgical-purpose arms 120 and the endoscopy-purpose arm 130.

As illustrated on FIG. 2, the plurality of surgical-purpose arms and the endoscopy-purpose arms include a plurality of links 121, 122, 123, and 124. Here, the adjacent links are connected by a joint, and a motor is provided at the joint.

That is, each arm includes a first link 121 connected to the body 110, a second link 122 connected to the first link 121 through the joint, and a third link 123 connected to the second link 122 through the joint.

Here, the first link 121, the second link 122, the third link 123, and the fourth link 124 are configured to rotate having the y axis of the first link 121 as a center, the third link 123 and the fourth link 124 are configured to rotate having the z axis of the second link 122 as a center, and the fourth link is configured to rotate having the z axis of the third link 123 as a center.

The fourth link 124 may be installed at the third link 123 in a way to rotate having the z axis of the third link 123.

Here, the surgical instrument 150 is detachably coupled to the fourth link 124. At this time, the surgical instrument 150 coupled to the fourth link 124 is electrically connected to a control apparatus 200.

Each of the plurality of surgical-purpose arms 120 and the endoscopy-purpose arm 130 includes motors 125, 126, and 127 configured to apply a moving force to each link for the each link to be moved. Thus, the plurality of surgical-purpose arms 120 and the endoscopy-purpose arm 130 may be configured to move freely, thereby able to precisely convey the hand movement of a user, that is, a physician.

More in particular, the plurality of surgical-purpose arms 120 and the endoscopy-purpose arm 130 includes a first motor 125 installed at an inside of the first link 121 and configured to rotate the second link 122, the third link 123, and the fourth link 124, a second motor 126 installed at an inside the second link 122 and configured to rotate the third link 123 and the fourth link 124, and a third motor 127 installed at an inside the third link 123 and configured to vertically move the fourth link 124.

That is, the plurality of surgical-purpose arms 120, by rotating each motor according to a command of the control, moves toward the direction of the multiple axes, and the surgical instrument 150, by rotating each motor according to the command transmitted from the console, moves toward the direction of the multiple axes to operate an end effector, and the endoscopy-purpose arm 130, by rotating each motor according to the command of the console, moves toward the direction of the multiple axes.

In addition, the plurality of surgical-purpose arms 120 and the endoscopy-purpose arm 130 may be manually moved by a user.

The manipulator assembly 100 may further include a torque detection unit 214 installed at a connecting portion 128 of each arm and the body 110 and configured to detect an external force that is applied to each arm.

Here, the torque detection unit 214, by using a multi-axis force and torque sensor, may be capable of detecting the three directional elements of the external force and the three directional elements of the moment that are conveyed to the arm. Here, the external force refers to the force of a user that is applied at each of the plurality of surgical-purpose arms 120 and the endoscopy-purpose arm 130.

The display apparatus 140 is an apparatus configured for an assistant, rather than for a physician, and is configured to output a surgical image of a treatment or a surgery in two or three dimensions.

As illustrated on FIG. 3, the surgical instrument 150 includes a first link 151, a second link 152 connected to the first link 151 through the joint, and an end effector 153 and an end effector 154 connected to the second link 152 and configured to perform a treatment or a surgical operation by contacting the affected area.

The end effector 153 and the end effector 154 are configured to rotate having the joint axis between the first link 151 and the second link 152 as a center, having the joint axis between the second link 152 and the end effector 153 and the end effector 154 as a center, and having the extended axis, that is, the z axis, of the first link 151.

In addition, the end effector 153 and the end effector 154 have an operating range.

The movements of the end effector 153 and the end effector 154 are taken place through a cable at an inside the first link 151. The cable as the above is configured to transmit the electrical signal conveyed through each arm.

The end effector 153 and the end effector 154 may be one of the end effectors among scissors, a grasper, a needle holder, a micro-dissector, a staple applier, a tacker, a suction irrigation tool, a clip applier, a cutting blade, an irrigator, a catheter, and a suction orifice.

In addition, the end effector of the surgical instrument may be provided with one of the probes of an electric surgery configured for ablating, resecting, cutting, and coagulating of a tissue.

A motor (now shown) is provided at the joint connecting the adjacent links of the surgical instrument 150. That is, the end effector is configured to rotate toward the direction of multiple axes by the motor of the joint.

The surgical instrument 150 may further include a sensor such as a strain gauge. By conveying the data sensed at the strain gauge to the console, and then to the input unit of which a user controls, a user may be able to directly feel the pressure, etc generated at the surgical instrument 150.

The manipulator assembly 100 further includes an input apparatus (not shown) such as a button or a switch provided on the body 110, and may be directly input with the operation command to control the plurality of arms and the surgical instrument from an assistant.

The console is an apparatus which enables a treatment or a surgery of an affected area by moving the surgical instrument exactly as the movement of a hypothetical surgical movement as a user hypothetically performs a surgical movement while referring to an image of an affected area obtained from an endoscopy of the manipulator assembly 100.

The console as the above includes the plurality of surgical-purpose arms 120 provided at the manipulator assembly 100, the endoscopy-purpose arm 130, and a manipulation unit configured to receive a control command to control the surgical instrument 150.

Here, the manipulation unit includes at least one or more of among a small-size wrist gym ball, a joystick, a glove, a trigger gun, and a voice recognition apparatus.

The manipulation unit may further include four foot pedals configured to guide a hemostasis or control a vertical or a horizontal movement of the surgical instrument or the endoscopy-purpose arm.

The console is configured to control the transmission of an operation command of a motor provided at an arm corresponding to a command manipulated through the manipulation unit, an operation command of the surgical instrument, and an operation command of the endoscopy, and store the position of the motor provided at the surgical instrument and the torque.

The console checks the position and the torque of the motor when the operation command is input to operate the motor, the surgical instrument, and the endoscopy provided at the arm, generate a next command by using the position and the torque checked, and control the transmission of the command generated.

The console further includes an output unit configured to output an image of an affected area for a user. The output unit includes an optical lens configured to view a stereo image.

The console is configured to transmit a command to the manipulator assembly 100 by conducting a cable/wireless communication with the manipulator assembly 100, and is capable of receiving the position and the torque of the motor provided at the arm of the manipulator assembly 100 and the surgical instrument.

The servo control apparatus 200 is positioned at the manipulator assembly 100, and is configured to control the operation of the motor provided at the plurality of arms and the surgical instrument. The servo control apparatus 200 is capable of conducting a cable/wireless communication with the console, and receives an operation command of the arm and the surgical instrument.

At this time, the servo control apparatus 200 determines the control mode of the motor that corresponds to the operation command transmitted from the console, and determines whether the control mode determined and the present control mode are same. The servo control apparatus, if determined that the control mode determined and the present control mode are different from each other, further determines a function corresponding to the form of change of the control mode that is to be changed from the present control mode, and controls the following of data from a sensing data to a command data by using the function determined.

Here, the sensing data refers to a data required at the control mode that is to be changed, and the command data refers to an initial data commanded at the control mode that is to be changed.

The servo control apparatus 200 may be positioned at the console. At this time, the console may generate a control command for operating the motor by receiving the sensing data of the motor from the manipulator assembly 100, and transmit the control command generated to the manipulator assembly 100.

The console, when transmitting the control command of the motor to the manipulator assembly 100, also transmits a protocol including a function that corresponds to the form of change of the control mode.

The console determines the present control mode and determines a control mode needed for performing a next operation. The console, if determined that the two control modes are different from each other, determines a function corresponding to the form of change of the control mode which is to be changed from the present control mode, and generates the protocol and transmits the protocol generated.

At this time, the protocol includes the form of change of the control mode and the information on the function.

The servo control apparatus 200 will be explained by referring to FIG. 4.

Figure 4:
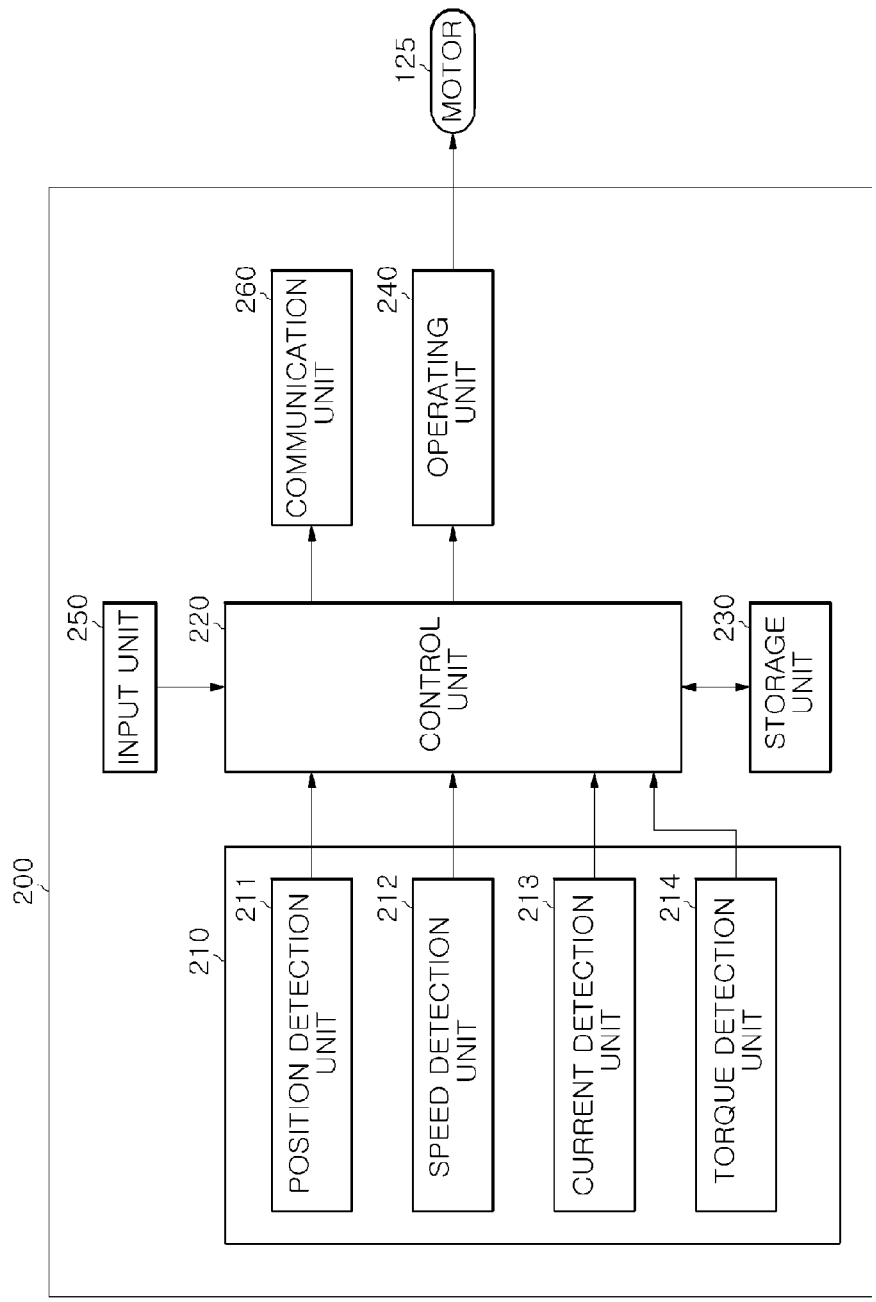
FIG. 4 is a control block diagram illustrating the servo control apparatus in accordance with the embodiment of the present disclosure.

FIG. 4 is a control block diagram of the servo control apparatus 200 in accordance with the embodiment of the present disclosure, and the servo control apparatus includes a detection unit 210, a control unit 220, a storage unit 230, an operating unit 240, and an input unit 250.

The motor 125, which is provided at the surgical arm, among the motors provided at the surgical robot will be used as an example for an explanation.

The detection unit 210 detects sensing data required from each control mode of the plurality of control modes which are configured to control the motor 125.

Here, the sensing data refers to the data used for monitoring the current state of the motor 125, and is continuously detected to be feedback.

As an example, the data on the actual position of the motor required at the position control mode, the data on the actual current of the motor required at the current control mode, and the data on the actual speed of the motor required at the speed control mode are detected at the detection unit 210.

The detection unit 210 includes a position detection unit 211, a speed detection unit 212, a current detection unit 213, and a torque detection unit 214.

The position detection unit 211 is configured to detect the rotational position of the motor while provided at the motor 125.

Here, the position detection unit 211 is configured to detect the rotation angle of the motor, and detects the rotational angle of the motor in connection with the rotation axis of the motor.

The position detection unit 211 may be embodied with one of among an incremental encoder, an absolute encoder, a magnetic encoder, and a potentiometer.

The speed detection unit 212 is configured to detect the rotational speed of the motor 125. The speed detection unit 212 may acquiring the rotational speed of the motor 125 by differentiating the rotation position of the motor 125 detected.

The current detection unit 213 is configured to detect the current applied to the motor 125.

The torque detection unit 214 is configured to detect the torque acting on the motor 125.

The control unit 220 may detect the acceleration speed of the motor by differentiating the speed detected, and also detect the torque corresponding to the current detected.

Here, the torque of the motor may be directly detected by using a torque sensor.

The control unit 220 is configured to control the operation of the motor 125 on the basis of the external force applied by a user, the operation command of the arm and the surgical instrument transmitted from the console, the operation command of the arm and the surgical instrument input through the input unit 250, and the information on operation change corresponding to a predetermined period of time information. At this time, the control unit 220 generates the control command of the motor according to the operation command.

The control unit 220 may directly receive the control command of the motor through the console and the input unit 250, or generate the control command of the motor on the basis of a predetermined period of time information.

The control unit 220, in a case when controlling the operation of the motor 125, is configured to select a control mode corresponding to the control command, and controls the operation of the motor 125 using the control mode selected. That is, the operation of the motor 125 is controlled by using one of the plurality of control modes.

Here, the plurality of control modes includes the position control mode, the speed control mode, the acceleration control mode, the current control mode, and the torque control mode.

In a case when the motor 125 is desired to be controlled with another control mode during the control at a certain control mode, the control unit 220 may be able to control the motor with the other control mode on the basis of the feedback of the plurality of sensing data received at the point of time of the changing of the control mode.

Here, the changing of the control mode may be possible in a case when the operation command of the arm and the surgical instrument is input through the input unit 250 and a communication unit 260, a case when the control command of the motor is input, or a case when a predetermined period of time is elapsed.

The sensing data includes a position, a speed, a current, an acceleration, and a torque.

More in particular, the control unit 220, when a command to control the motor 125 with a second control mode is input while the motor 125 is being controlled with a first control mode, determines the current time is the point of time to change the control mode, checks the sensing data required for the execution of the second control mode among the feedback of the plurality of sensing data provided at the point of time when the first control mode is stopped, and controls the following of the difference from the sensing data checked to the command data of the second control mode.

As an example, the control unit 220, in a case when changing to the position control mode, follows the position difference between a position based on a position command and a position detected. Also, the control unit 220, in a case when changing to the speed control mode, follows the speed difference between a speed based on a speed command and a speed detected. Further, the control unit 220, in a case when changing to the current control mode, follows the current difference between a current based on a current command and a current detected.

In addition, the control unit 220 calculates a current to follow the data difference, and controls a pulse width modulation of the electrical power such that the current calculated is applied to the motor.

Thus, the values ranging from the current sensing data of the motor to the command data value that corresponds to the second control mode may be smoothly changed.

The control unit 220, since a t_delay develops when following the data, controls the following of the data to take place promptly within a range of the output of the motor not exceeding the maximum critical value that is allowable for the servo control apparatus, thereby minimizing the t-delay.

At this time, the control unit 220, when following the data, is configured to use one of the functions among a reset function, a linear function, a sinusoidal function, and a polynomial function.

The control unit 220 is configured to store a protocol in which a first code corresponding to the control mode and a second code corresponding to a plurality of functions configured to follow from the sensing data to the command data are set, and follows the data difference based on the protocol being set.

In addition, the control unit 220 is configured to control the transmission/reception of the console and the protocol. That is, the control unit 220, when the protocol is transmitted from the console, controls the motor based on the information on the protocol transmitted.

As an example, the control unit 220 sets the first code of each control mode such that the position control mode corresponds to the first code of 0001, the speed control mode corresponds to the first code of 0010, the current control mode corresponds to the first code of 0011, and the torque control mode corresponds to the first code 0100.

At this time, in a case when controlling the motor using the position control mode, the first code 0001 is transmitted, and when changed to the current control mode, the first code 0011 is transmitted.

In addition, the reset function is set as the second code 00, the linear function is set as the second code 01, the sinusoidal function is set as the second code 10, and the polynomial function is set as the second code 11.

Here, the reset function, in a case when the control mode is changed, resets all data to 0 or a certain value that is determined in advance according to each mode.

The linear function is configured in a way that the sensing data follows the command data in a linear manner.

The sinusoidal function is configured in a way that the sensing data follows the command data in a form of sinusoidal graphs.

The polynomial function is configured in a way that the sensing data follows the command data in a form of polynomial graphs.

Thus, in a case when the data is followed by using the linear function, as the sensing data connects the command data in a linear form, the embodiment of the following may be easily occurred and may be most promptly conducted.

In addition, in a case when the data is followed by using the sinusoidal function, the sensing data may follow the command data further smoothly.

In a case when the data is followed by using the polynomial function, by embodying the following of the data in a polynomial expression, a stable response may be taken place according to the change of the control mode.

Figure 5:
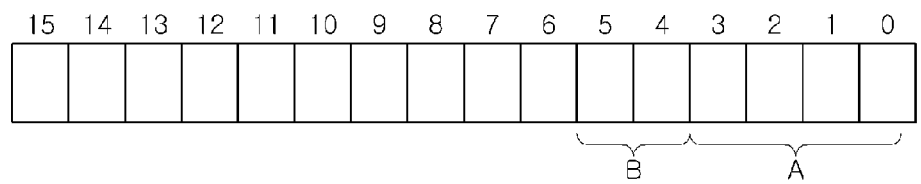
FIG. 5 is a view illustrating a protocol stored at the servo control apparatus in accordance with the embodiment of the present disclosure.

As illustrated on FIG. 5, the first code is stored at an area A having 4-bit length positioned between the zero bit to the third bit in the protocol, and the second code is stored at an area B having 2-bit length positioned between the fourth bit and the fifth bit.

In this manner, the function configured to follow the data difference according to the form of change may be stored.

As an example, in a case of changing the control mode from the position control mode to the current control mode, when the data difference is to be followed through the sinusoidal function, 0, 1, 1, 1, 0, and 0 are stored in the fifth, fourth, third, second, first, and the zero bit, respectively.

Here, the first code and the second code may be embodied in bytes other than in bits.

The protocol is also stored at the console, and changing the control mode of the motor may be possible through the protocol.

The storage unit 230 is configured to store the feedback of the sensing data. The feedback of the sensing data includes a position, a speed, an acceleration, a current, and a torque.

The storage unit 230 is configured to store the protocol set with the function to follow the data difference according to the form of the change of the control mode.

The operating unit 240 is configured to operate the motor 125 according to the command of the control unit 220. The operating unit 240 includes a switching device configured to modify a pulse width.

The input unit 250 is configured to receive the operation command of the plurality of surgical-purpose arms 120 and the endoscopy-purpose arm 130 as well as the operation command of the surgical instrument 150 from a user. In addition, the input unit 250 may directly receive the operation command of the motor.

The input unit 250 may also receive one of the plurality of control modes configured to control the motor 125.

The input unit 250 is configured to receive the protocol set with the function corresponding to the form of the change of the control mode from a user.

That is, the protocol is generated in a manner suitable for the controlling purpose of the motor, and the optimal protocol is selected to execute the operation command of the motor.

The communication unit 260 is configured to transmit/receive the protocol with respect to the external apparatus, that is the console.

That is, the communication unit 260 may receive the operation command of the motor being transmitted from the console and transmit the received operation command to the control unit 220, and also may transmit the sensing data to the control.

Here, the operation command of the motor is received along with the protocol. In addition, in a case that the protocol is generated again, the protocol generated again is transmitted to the console.

Figure 6:
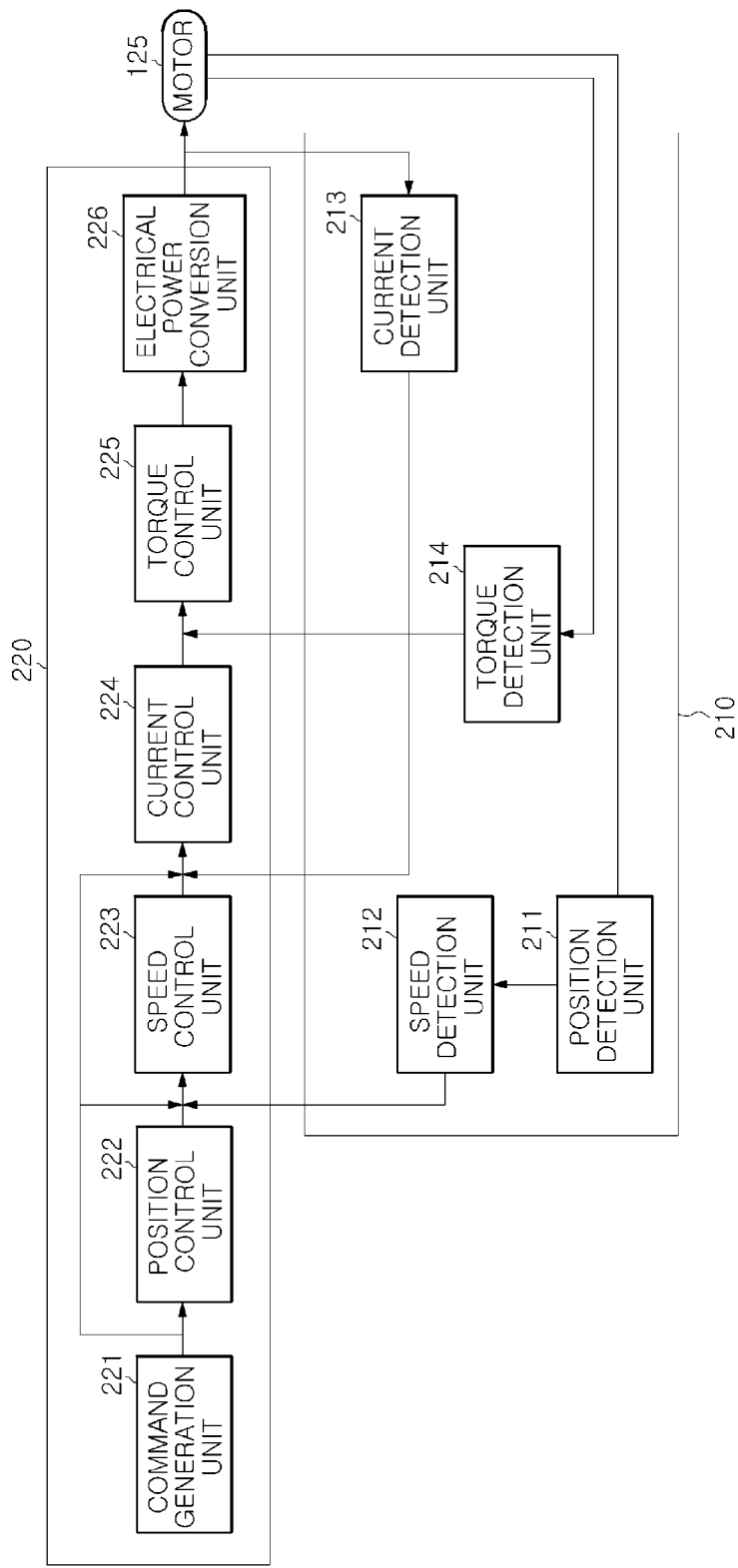
FIG. 6 is a detailed control block diagram of the servo control apparatus in accordance with the embodiment of the present disclosure.

The control structure of the motor of the control unit 220 will be explained in detail by referring to FIG. 6.

As an example of the plurality of control modes, the position control mode, the speed control mode, and the current control mode will be explained as examples.

The position detection unit 211 among the detection unit 210 is configured to detect the position of the motor and provide a feedback to a position control unit 222, the speed detection unit 212 is configured to detect the speed of the motor and provide a feedback to a speed control unit 223, the current detection unit 213 is configured to detect the current of the motor and provide a feedback to a current control unit 224, and the torque detection unit 214 is configured to detect the torque of the motor and provide a feedback to a torque control unit 225.

Here, the speed detection unit 212 is the differentiation unit configured to differentiate a position detected at the position detection unit and configured to detect an actual speed.

The control unit 220 configured to control the operation of the motor 125 includes a command generation unit 221, the position control unit 222, the speed control unit 223, the current control unit 224, and torque control unit 225, and an electrical power conversion unit 226.

The command generation unit 221, in response to the command transmitted from the input unit 220 or the console, is configured to generate at least one command among the position command, the speed command, and the current command.

Alternatively, the command generation unit 221, when a predetermined period of time is elapsed, may be able to generate a command corresponding to a control mode determined.

The command generation unit 221, when the position command according to the position control mode is generated, transmits the position command generated to the position control unit 222. The command generation unit 221, when the speed command according to the speed control mode is generated, transmits the speed command generated to the speed control unit 223. The command generation unit 221, when the current command according to the current control mode is generated, transmits the current command to the current control unit 224. The command generation unit 221, when the torque command according to the torque control mode is generated, transmits the torque command to the torque control unit 225.

The position control unit 222 compares a position corresponding to the position command transmitted from the command generation unit 221 with a position transmitted from the position detection unit 211, calculates a current configured to follow the position difference between the position corresponding to the position command and the position detected, and transmits the current calculated to the current control unit 224.

The position control unit 222 may calculate a speed command on the basis of the position transmitted from the position detection unit 211 and the position corresponding to the position command transmitted from the command generation unit 221, and transmit the speed command calculated to the speed control unit 223.

The speed control unit 223 compares a speed corresponding to the speed command transmitted from the command generation unit 221 with a speed transmitted from the speed detection unit 212, calculates a current configured to follow the speed difference between the speed corresponding to the speed command and the position detected, and transmits the current calculated to the current control unit 224.

Alternatively, the speed control unit 223, when the speed command is transmitted from the position control unit 222, may calculate the current for following the speed difference between the speed corresponding to the speed command transmitted and the speed detected at the speed detection unit 212, and transmit the current calculated to the current control unit 224. Thus, in case when controlling the motor at the position control mode, the response rate as well as the following of the torque may be enhanced.

The current control unit 224 calculates a current for following the current difference between a current corresponding to the current command transmitted from the command generation unit 221 and a current detected at the current detection unit 213.

The current control unit 224 controls the current so that the current calculated from the position control unit 222 or the speed control unit 223 is applied to the motor.

In addition, the current control unit 224 controls the current so that the current calculated according to the current control mode is applied to the motor.

The torque control unit 225 calculates a current for following the torque difference between a torque corresponding to the torque command transmitted from the command generation unit 221 and a torque detected from the torque detection unit 214. The electrical power conversion unit 226 controls the pulse width modulation (PWM) of pulse so that the current calculated is applied to the motor.

Figure 7:
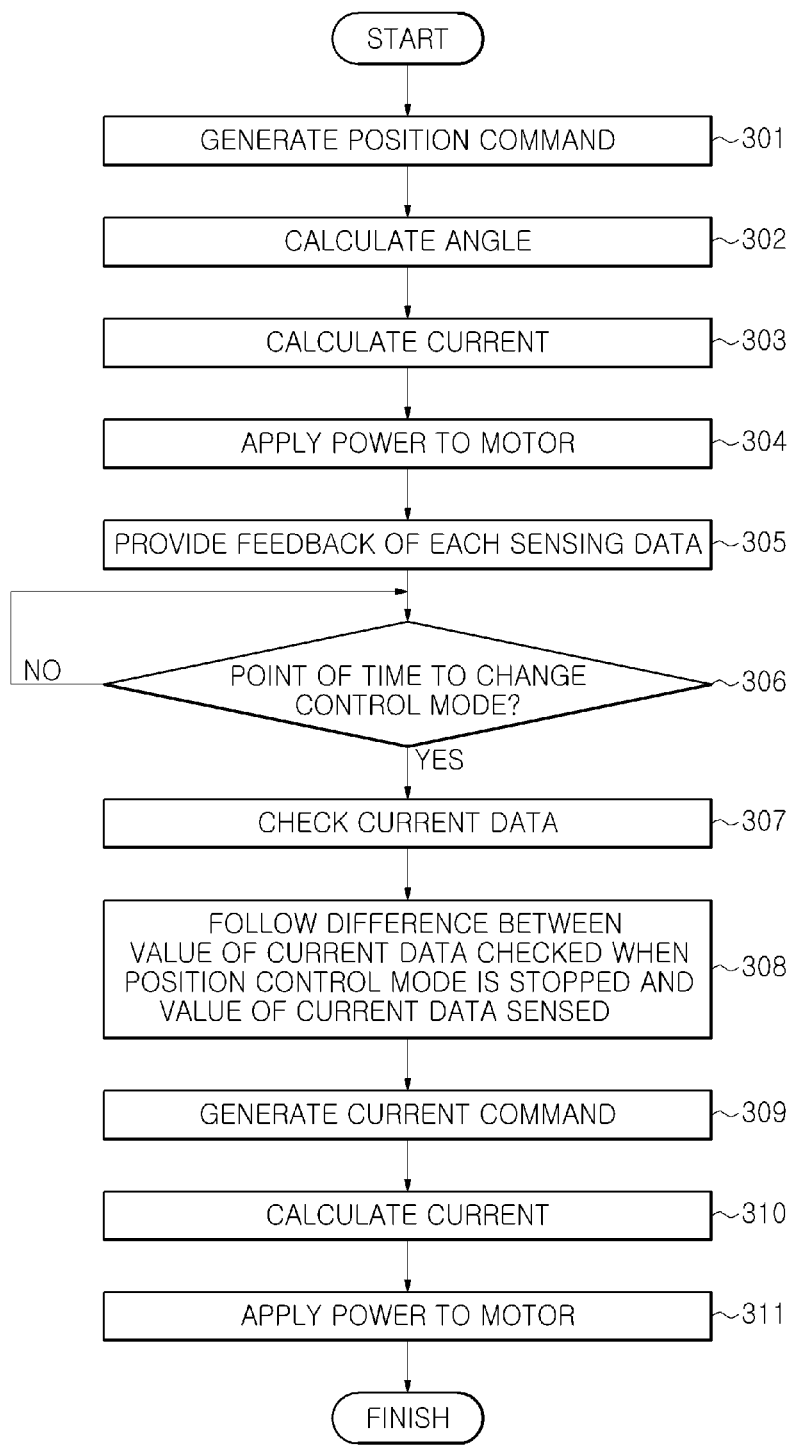
FIG. 7 is a control flow chart of the servo control apparatus in accordance with the embodiment of the present disclosure.

FIG. 7 is a control flow chart of a surgical robot in accordance with the embodiment of the present disclosure, and the control of the surgical robot will be explained in conjunction with FIGS. 8 to 9.

FIG. 7 is a control flow chart at the time of changing the control mode from the first control mode to the second control mode.

Here, the following description will be made in relation that the first control mode and the second control mode are the position control mode and the current control mode, respectively, as an example.

The surgical robot performs a treatment or a surgery on an affected area by executing a position control mode configured to control the position of the motor 125 on the basis of the command transmitted from the console.

Here, the performing of the position control mode refers to the generating of a position command on the basis of the command transmitted from the console (301), the calculating of an angle corresponding to the position command generated (302), and the generating of a speed command corresponding to the angle generated.

Next, the servo control apparatus 200 generates a torque command corresponding to the speed command, and calculates a current for following the torque command generated (303).

Alternatively, the position of the motor may be detected, the actual speed may be calculated by differentiating the position detected, and a torque command may be generated by reflecting the actual speed calculated on a speed command.

In addition, when calculating the current for following the torque command, an actual current applied to the motor may be fed back and reflected on the calculation of the current.

Next, the servo control apparatus 200 controls the pulse width modulation of the electrical power such that the current calculated is applied to the motor.

Thus, the servo control apparatus 200, by applying the modulated electrical power to the motor 125 (304), enables the motor 125 to rotate to a position corresponding to the position command.

That is, the servo control apparatus 200, when controlling at the position control mode, operates the motor 125 such that the arm to move to the desired position on the basis of the position command, and by applying further the speed command based on the speed detected, enables the arm to move to the desired position in a smoother and much precise manner. Thus, the characteristic of response in the controlling of a position is enhanced.

By controlling the motor at the position control mode, the servo control apparatus 200 detects various sensing data with reference to the motor 125, and receives the feedback of the various sensing data detected (305).

In addition, the servo control apparatus 200, while controlling the motor at the position control mode, determines the point of time to change the control mode (306).

Here, the determining of the point of time to change the control mode refers to the determining of the point of the elapse of a predetermined period of time configured to execute another operation while controlling the motor at the position control mode, or the determining of the point of the input of the command for executing another operation through the input unit 250 or the communication unit 260.

The servo control apparatus 200, when determined that the control mode is changed from the position control mode to the current control mode, determines that the current time is the point of time to change the control mode and checks the sensing data provided shortly before changing the control mode, that is, the point of time when the position control mode is stopped.

At this time, the sensing data, that is, the current detected, required for executing the current control mode, is checked (307).

Next, the servo control apparatus 200 checks a current command, that is, a command data of the current control mode at the point of time when the control mode is changed.

Next, the servo control apparatus 200 calculates the current difference between a current detected and a current corresponding to the current command, and follows the current difference calculated (308).

At this time, the current difference calculated is followed by using one of the functions among the reset function, the linear function, the sinusoidal function, and the polynomial function.

Figure 8:
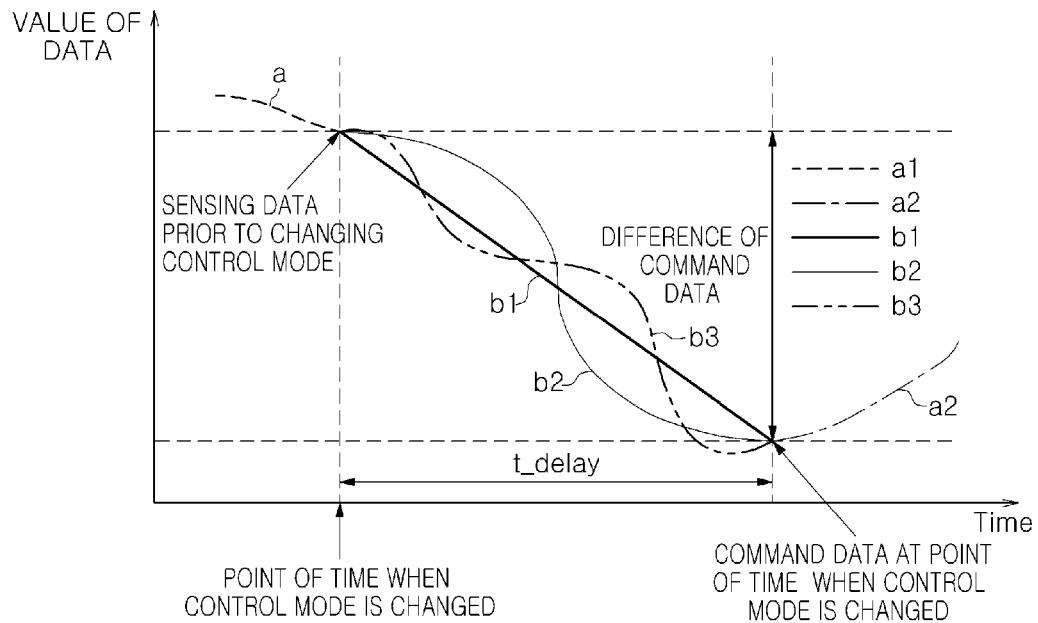
FIGS. 8 to 9 are views of a data following of the servo control apparatus in accordance with the embodiment of the present disclosure.
Figure 9:
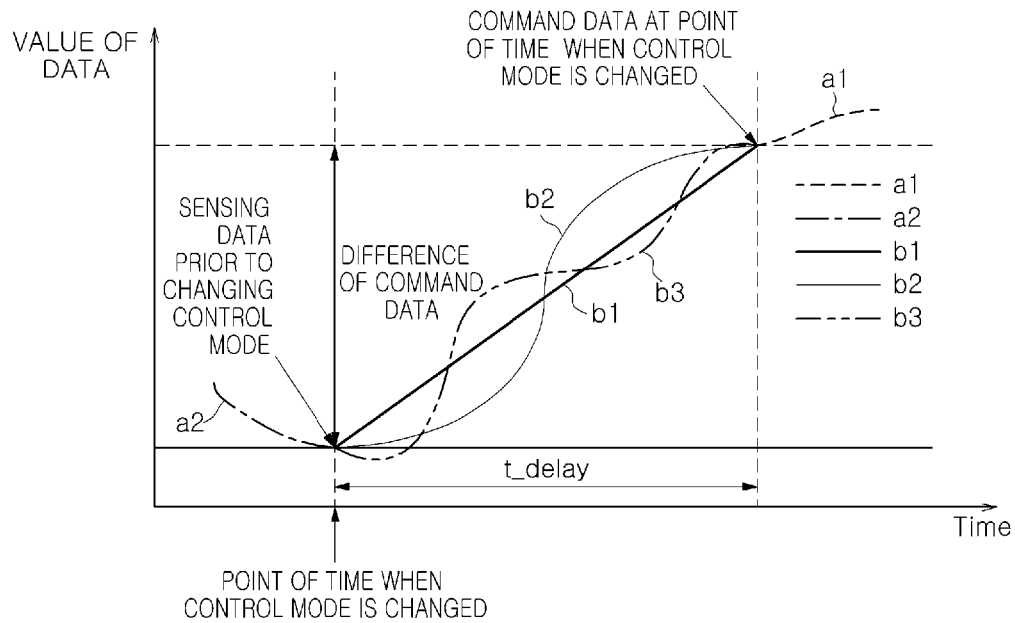

As illustrated on FIGS. 8 to 9, by smoothly changing the data from the value of the sensing data at the first control mode to the value of the command data of the second control mode regardless of the increase/decrease of the data value, the motor may be stably controlled.

Here, a1 refers to the value of the sensing data, a2 refers to the value of the command data, b1 refers to the graph following the value difference between the sensing data and the command data through the linear function, b2 refers to the graph following the value difference between the sensing data and the command data through the sinusoidal function, and b3 refers to the graph following the value difference between the sensing data and the command data through the polynomial function.

In addition, the following of the current difference, by using the optimal function corresponding to the form of change of the control mode from the position control mode to the current control mode on the basis of the information on the protocol, may be possible. The protocol at this time corresponds to a case when the command is transmitted from the console.

Next, the servo control apparatus 200, when the following of the current difference is completed, controls the motor using the current control mode.

Here, the controlling of the motor using the current control mode refers to the generating of a current command of the motor for the arm to move smoothly (309), and the controlling of a pulse width modulation of the electrical power for a current corresponding to the current command is applied to the motor (311).

At this time, an actual current to be applied to the motor is calculated by comparing the current corresponding to the current command with a current detected (310) and the electrical power is converted by adjusting the pulse width for the actual current calculated is applied to the motor (311).

Thus, the motor 125 is configured to rotate in response to the current command.

After following the data difference between the sensing data and the command data and controlling the motor at the changed control mode, the vibration occurring at the time of changing a mode may be reduced, and the stability in controlling the motor may be enhanced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A servo control apparatus, comprising:
   an input unit configured to receive an execution command with respect to one of a first control mode and a second control mode that are configured to control a motor;
   a plurality of detection units each configured to detect sensing data required for executing each of the first control mode and the second control mode; and
   a control unit configured to receive a feedback of the plurality of pieces of sensing data detected through the plurality of detection units while executing the first control mode, determine a point of time when a control mode is needed to be changed if the execution command with respect to the second control mode is input through the input unit, check the sensing data required for executing the second control mode among the plurality of sensing data that are fed back, and control a following from the sensing data checked to a command data corresponding to the execution command of the second control mode,
   wherein the first control mode is one of a position control mode, a speed control mode, an acceleration control mode, a current control mode, and a torque control mode,
   the second control mode is one of a position control mode, a speed control mode, an acceleration control mode, a current control mode, and a torque control mode, and
   the first control mode is a control mode different from the second control mode.

2. The servo control apparatus of claim 1, wherein:
   the control unit is configured to control the following from the sensing data to the command data by using at least one of a linear function, a sinusoidal function, and a polynomial function.

3. The servo control apparatus of claim 2, wherein:
   the control unit is configured to store a protocol that is set with a first code corresponding to the control mode and a second code corresponding to a plurality of functions that is required for following from the sensing data to the command data.

4. The servo control apparatus of claim 3, wherein:
   the function further comprises a reset function configured to reset the sensing data and the command data at a certain value.

5. The servo control apparatus of claim 4, wherein:
   the control unit is configured to control a transmission/reception of the protocol in a case of changing the control mode.

6. The servo control apparatus of claim 1, wherein the detection unit comprises:
   a position detection unit configured to detect a rotational position of the motor; and
   a current detection unit configured to detect an electric current flowing at the motor.

7. The servo control apparatus of claim 6, wherein:
   the control unit is configured to detect a torque based on the current detected.

8. The servo control apparatus of claim 6, further comprising:
   a torque detection unit configured to detect the torque of the motor.

9. The servo control apparatus of claim 6, wherein:
   the detection unit further comprises a speed detection unit configured to detect a rotational speed of the motor by differentiating the rotational position.

10. The servo control apparatus of claim 9, wherein:
    the control unit is configured to detect an acceleration speed based on the rotational speed detected.

11. The servo control apparatus of claim 9, wherein the control unit comprises:
    a command generating unit configured to generate at least one of a position command, a speed command, a current command, and a torque command;
    a position control unit, when the position command is generated, configured to follow a position difference between a position data based on the position command and a position data detected;
    a speed control unit, when the speed command is generated, configured to follow a speed difference between a speed data based on the speed command and a speed data detected;
    a current control unit, when the current command is generated, configured to follow a current difference between a current data based on the current command and a current data detected, calculate a current required for following the data difference, and control the generation of the current calculated;
    a torque generating unit, when the torque command is generated, configured to generate a current to follow a torque difference between a torque data based on the torque command and a torque data detected; and
    a power converting unit configured to modulate a pulse width of a power applied to the motor so as to control the current required for following the data difference.

12. The servo control apparatus of claim 11, wherein:
    the current control unit, when the following of the data is completed, is configured to calculate a current required for following a torque corresponding to the command data of the second control mode, and control an output of the current calculated.

13. A method of controlling a servo control apparatus, the method comprising:
    controlling a motor through one of a plurality of control modes that is configured to control the motor;
    receiving a feedback of a plurality of sensing data detected through a plurality of detection units during execution of a certain one of the plurality of control modes;
    determining a point of time to change a control mode if an execution command with respect to another control mode is input;
    checking a sensing data required during the execution of the other control mode among the feedback of the plurality of sensing data provided at the point of time when the certain one of the control mode is stopped;
    following data from the sensing data checked to an initial command data of the other control mode; and
    controlling the motor through the other control mode when the following from the sensing data checked to the initial command data of the other control mode is completed,
    wherein the one certain control mode is one of a position control mode, a speed control mode, an acceleration control mode, a current control mode, and a torque control mode,
    the other control mode is a position control mode, a speed control mode, an acceleration control mode, a current control mode, and a torque control mode, and
    the one certain control mode is a control mode different from the other control mode.

14. The method of claim 13, wherein:

the following of data comprises following data from the sensing data to the command data by using at least one of a linear function, a sinusoidal function, and a polynomial function.

15. The method of claim 14, wherein:

the following of data comprises following data based on a protocol set with a first code corresponding to a form of change of the control mode from the one certain control mode to the other control mode, and a second code corresponding to a plurality of functions to follow the data from the sensing data to the command data.

16. The method of claim 15, wherein:

the function further comprises a reset function configured to reset the sensing data and the command data at a certain value.

17. The method of claim 13, wherein:

the receiving of the feedback of the plurality of sensing data comprises detecting a rotational speed and a current of the motor during the execution of the one certain control mode.

18. The method of claim 17, wherein the receiving of the feedback of the plurality of sensing data further comprises:

detecting a torque based on the current detected, detecting a rotational speed of the motor by differentiating the position, and detecting an acceleration based on the speed detected.

19. The method of claim 18, wherein the following of data comprises:

calculating a torque to follow the data difference, calculating a current to follow the torque calculated, and modulating a pulse width of power applied to a motor for generating the current calculated.

* * * * *